May 18, 1943. W. F. GROENE ET AL 2,319,451
GUN RIFLING MACHINE
Filed June 18, 1941 7 Sheets-Sheet 1
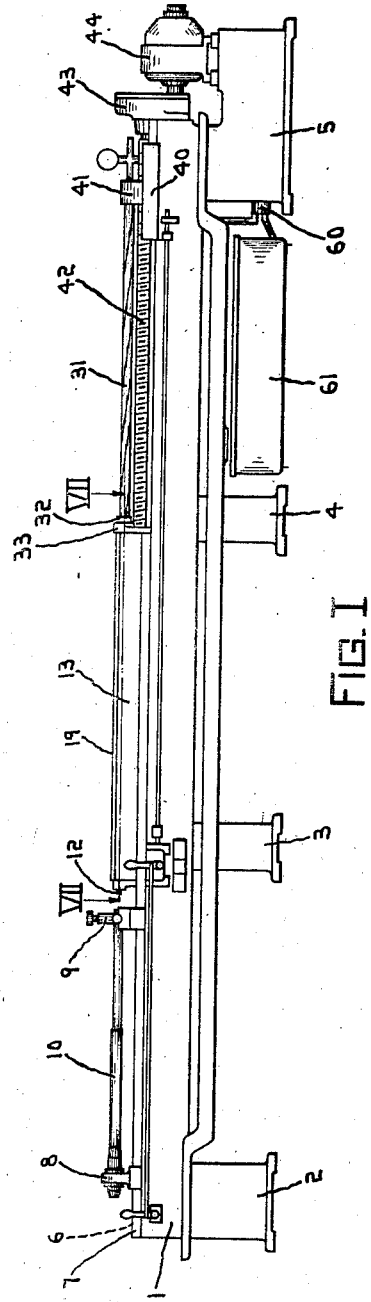
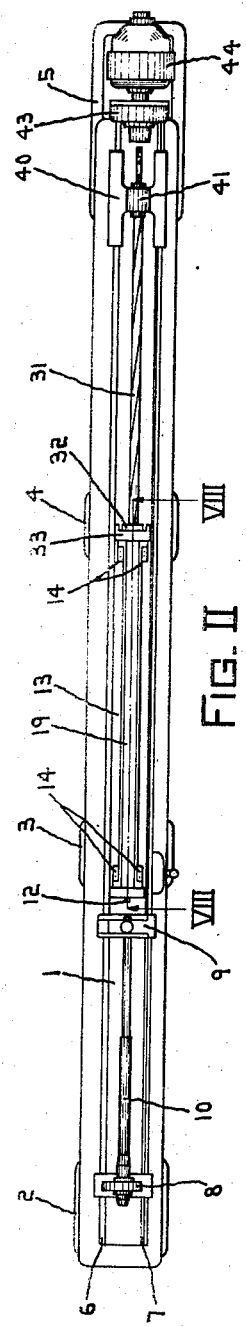
INVENTOR.
WILLIAM F. GROENE,
WALTER R. MEYER
BY Willard S. Groene

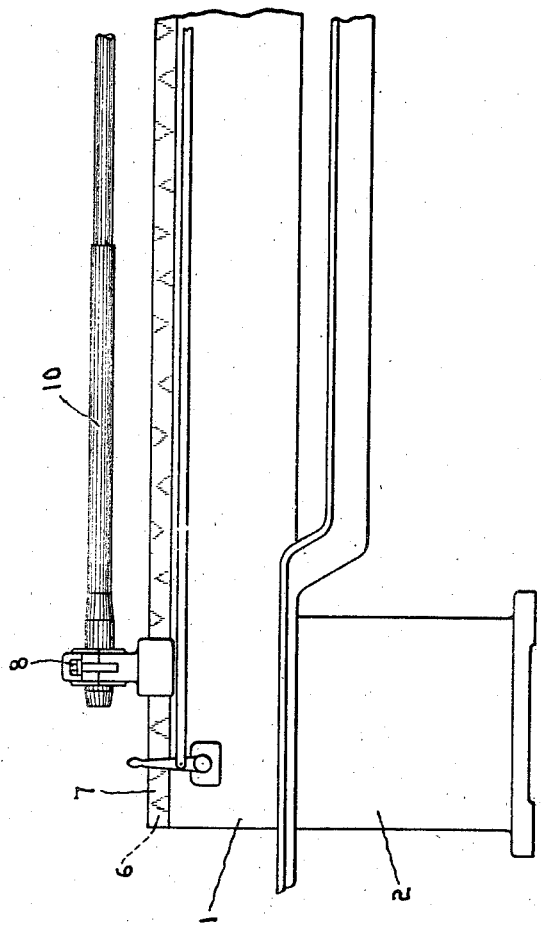

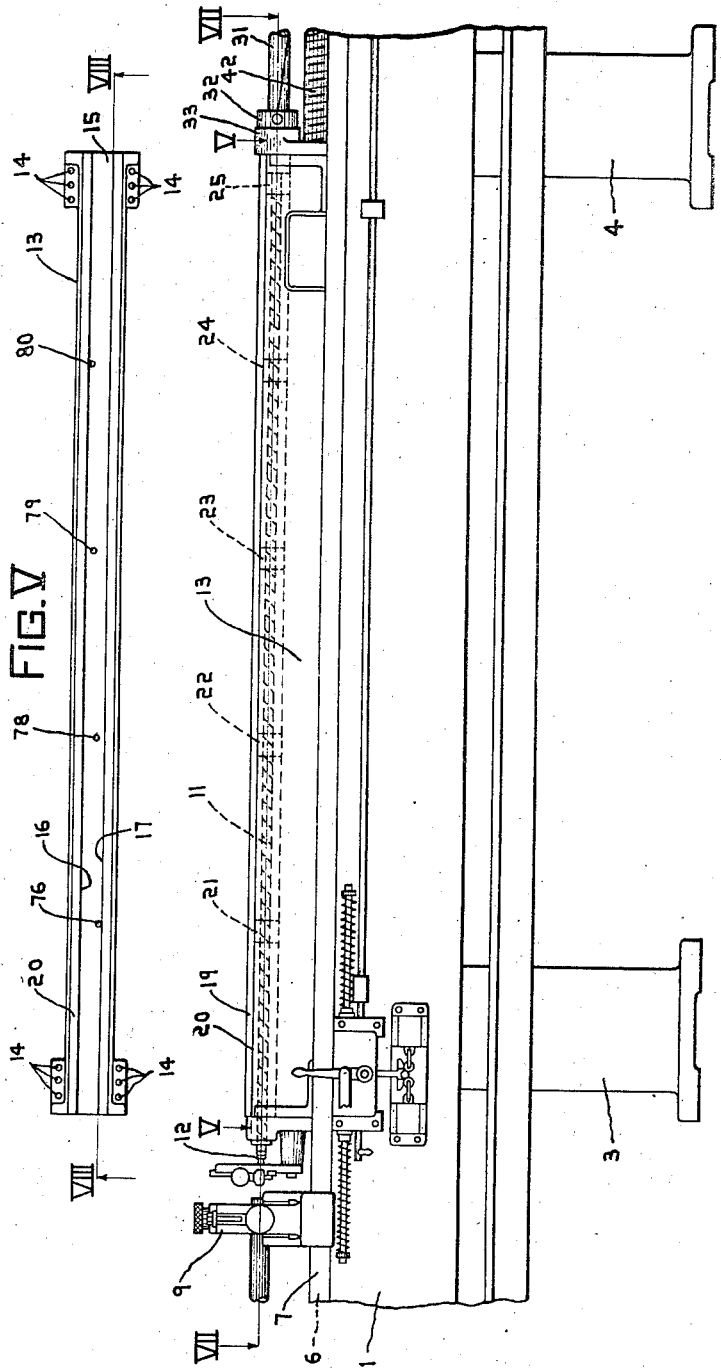

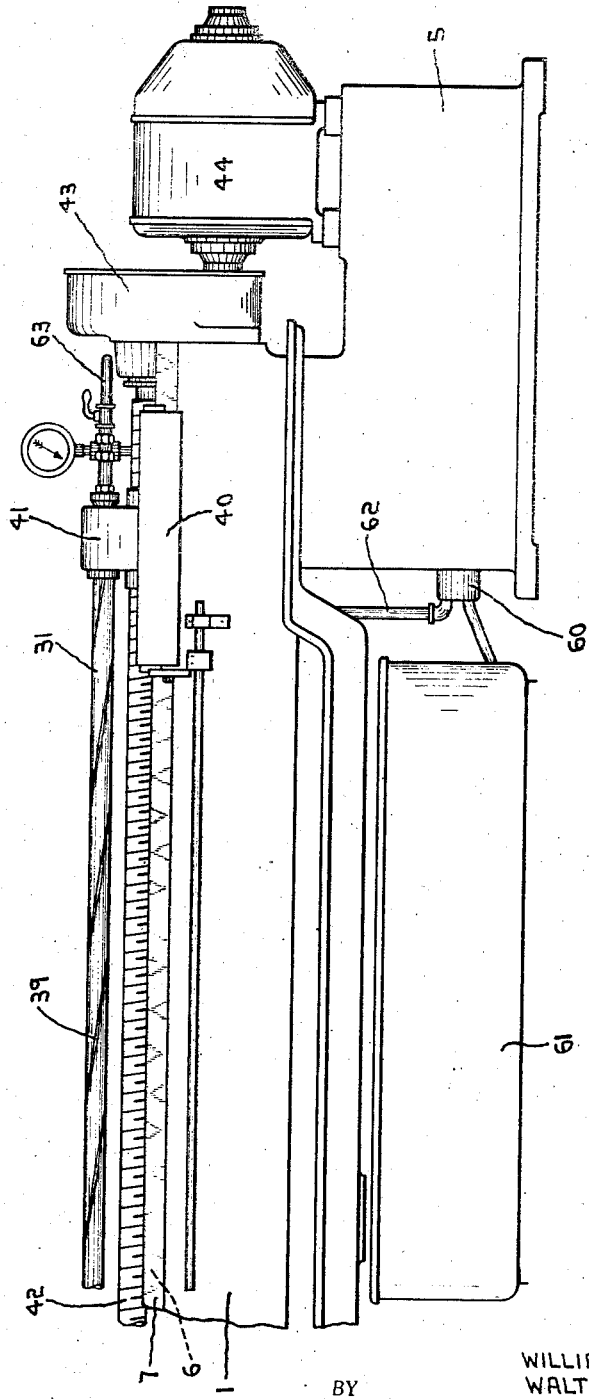

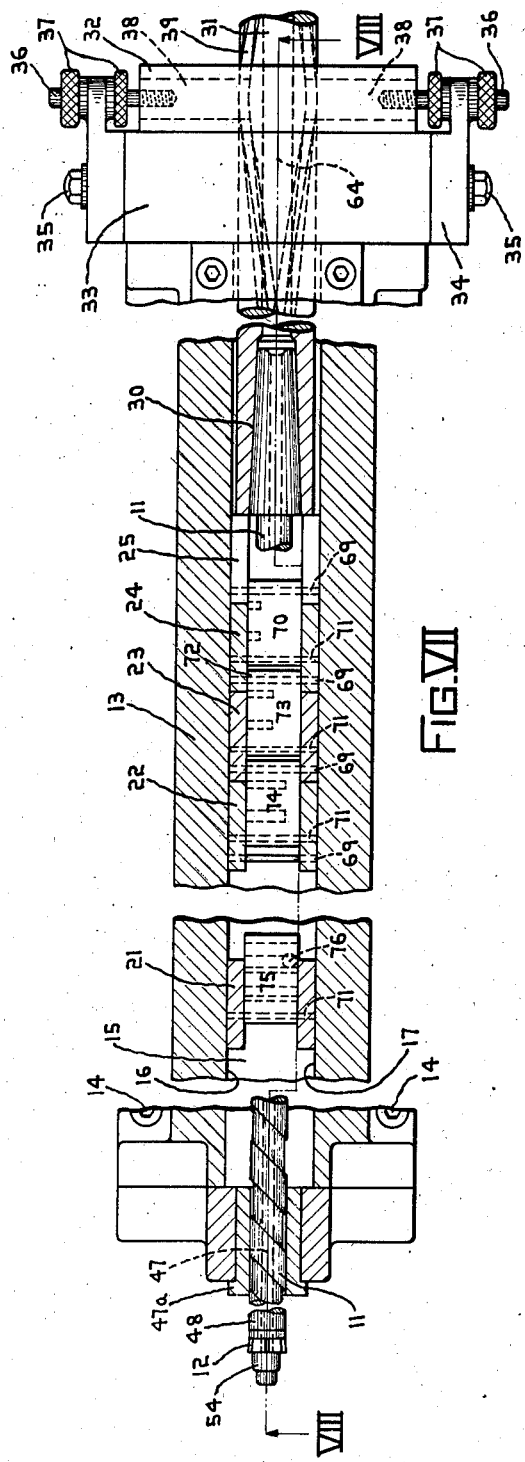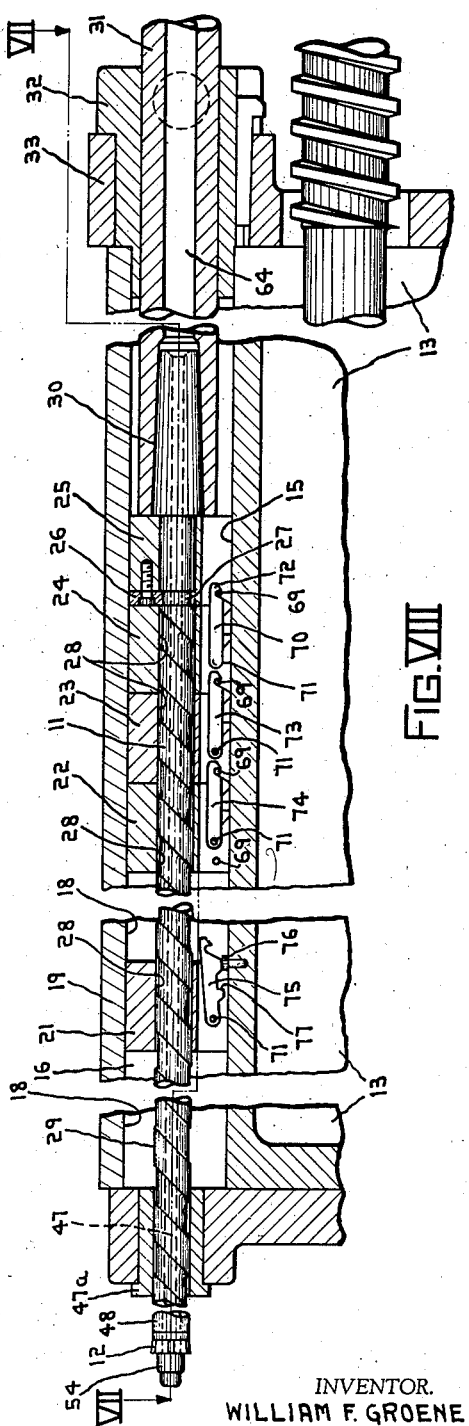

May 18, 1943. W. F. GROENE ET AL 2,319,451
GUN RIFLING MACHINE
Filed June 18, 1941 7 Sheets-Sheet 6
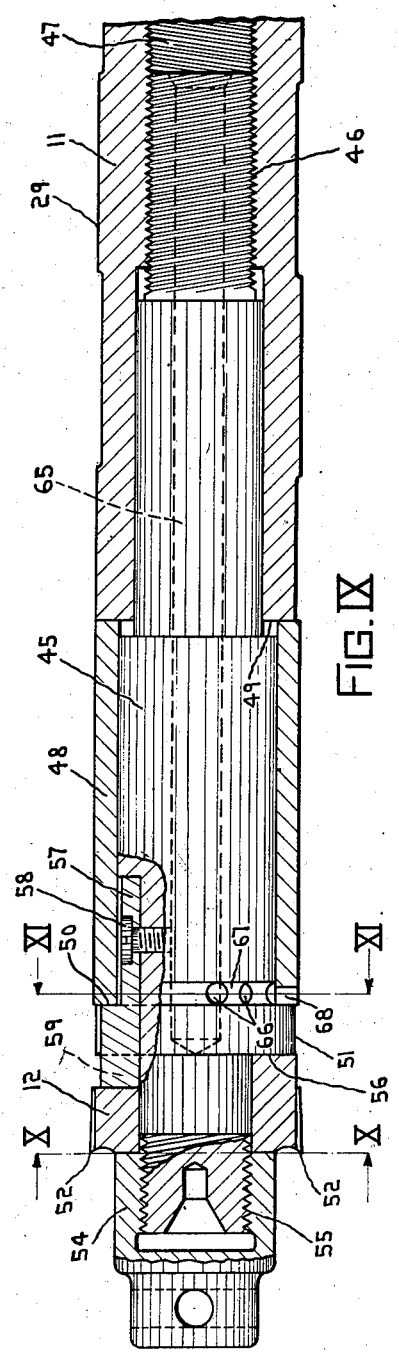
FIG. IX
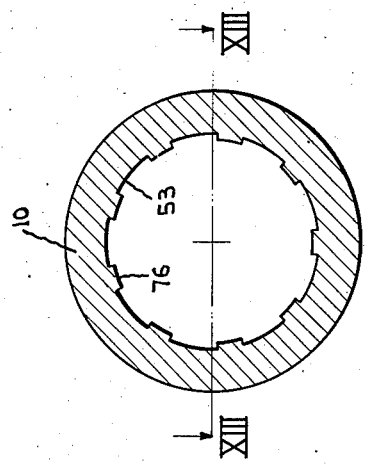
FIG. XII
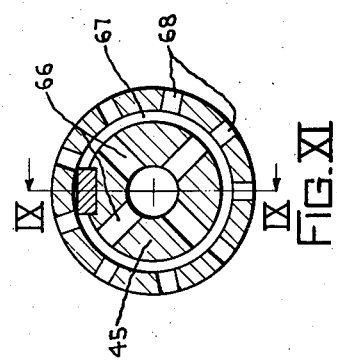
FIG. XI
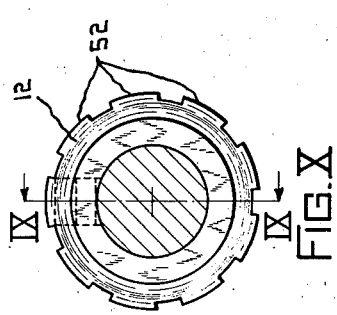
FIG. X
INVENTOR.
WILLIAM F. GROENE
WATER R. MEYER
BY Willard S. Groene

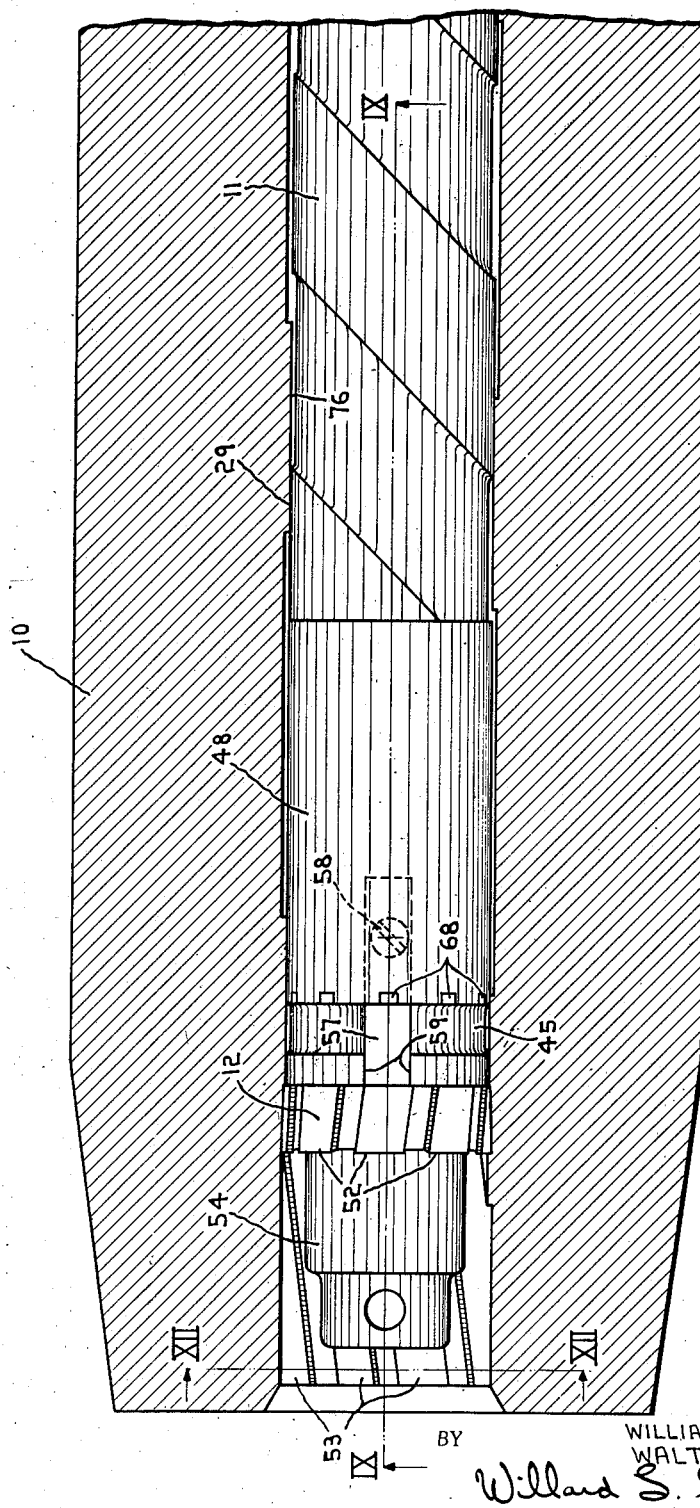
Fig. XIII

Patented May 18, 1943

2,319,451

UNITED STATES PATENT OFFICE 2,319,451

GUN RIFLING MACHINE

William F. Groene and Walter R. Meyer, Cincinnati, Ohio, assignors to The R. K. Le Blond Machine Tool Company, Cincinnati, Ohio, a corporation of Delaware Application June 18, 1941, Serial No. 398,646

5 Claims. (Cl. 90—28.1)

This invention pertains to a machine for cutting the rifling in the bores of guns and is particularly related to a method and apparatus for broaching the rifling grooves in the gun bore. More particularly, this invention pertains to a novel arrangement for supporting the broaching bar which carries the broaching discs which are forced through the bore of the gun to effect the cutting of the rifling grooves therein.

Present day accepted practice in rifling guns is that of broaching these grooves by pushing a series of broaching discs through the previously bored gun and to successively present these various broaching discs in the bore of the gun until the rifling has been prepared to the proper depth and size. These broaching discs are carried on a pilot shank which is mounted on the end of the bar and which is guided in the bore of the gun.

Because of the nature of the chips removed by the broaching disc cutters, it is necessary that the cutters precede any portion of the broaching bar or the pilot shank fixed on the end of the bar so that the chips cut by the cutter do not interfere with the proper sliding action of the shank in the bore of the gun. The result of this fact is that the cutter must be pushed by the broaching bar through the bore of the gun to effect the rifling operation. This necessary pushing action causes the broaching bars to tend to bend or spring sideways under compressive forces set up by the cutting action of the broaching disc cutters in the rifling grooves of the gun so that difficulty is experienced with properly holding this broaching bar rigidly against axial bending and chatter which results from this type of distortive movement in the rifling bar. It is therefore one of the chief objects of this invention to eliminate entirely this difficulty of the bending of the broaching bar during the cutting action of the broaching cutters in the gun.

Another object of this invention is to provide means for preventing the bending of the broaching bar by accurately and positively guiding the broaching bar along its entire length both in the bore of the gun and also when outside of the bore of the gun, so that no possible bending action sideways can take place in the broaching bar. This, of course, results in very accurate machining of the grooves of the rifling in the gun and also completely eliminates the initial chattered or distorted portions which have heretofore occurred in the gun at the beginning of the broaching stroke. In the past, in order to eliminate this chattered portion of the gun, it was found necessary to make the gun oversize in overall length and to cut off this portion of the gun after the rifling had been complete. Thus with this arrangement, this unnecessary, wasteful, and costly procedure has been eliminated.

And still another object of this invention is to provide in an apparatus for broaching the rifling grooves in guns, a broaching bar arrangement, and a spirally grooved bar arrangement associated with the boring bar, so arranged that the spiral guide grooves for giving the lead to the rifling do not at any time enter the bore of the gun, nor become exposed to the chips or any foreign matter removed from the gun bore during the rifling operation.

Further features and advantages of this invention will appear from a detailed description of the drawings in which:

Figure I is a front elevational view of a machine incorporating our novel process and arrangement for rigidly guiding the rifling broaching bar positively at all times both in the gun bore and when outside of said gun bore.

Figure II is a plan view of the rifling machine shown in Figure I.

Figure III is an enlarged fragmentary plan view of the left hand end of the rifling machine shown in Figure I, particularly showing the mounting for the gun to be rifled on the bed of the machine.

Figure IV is an enlarged fragmentary plan view of the central portion of the machine, particularly showing the guiding means for rigidly supporting the broaching bar against sidewise bending when outside of the bore of the gun to be rifled.

Figure V is a detailed plan view on the line V—V of Figure IV of the housing for carrying the supporting members for the rifle broaching bar when removed from the bore of the gun.

Figure VI is an enlarged fragmentary plan view on the right hand end of the rifling machine shown in Figure I, particularly showing the rifle groove guide bar for rotating the broaching bar for effecting the proper lead for the rifling grooves and also showing the drive for actuating the broaching bar carriage longitudinally of the machine bed.

Figure VII is a fragmentary sectional view on the line VII—VII of Figures I, IV and VIII, particularly showing the supporting members for the rifling bar when outside of the gun bore and also the spiral guide grooves in the spiral guide bar arrangement for rotating the broaching bar for effecting the proper lead in the rifling in the gun.

Figure VIII is a fragmentary sectional view on the line VIII—VIII of Figures II, V, and VII, showing the operating mechanism for controlling the motion of the supporting means for the broaching bar when out of the gun bore.

Figure IX is an enlarged detailed sectional view through the broaching disc shank showing the broaching disc mounted thereon and in connection to the broaching bar as illustrated on the line IX—IX of Figures X, XI, and XIII.

Figure X is a face view of the broaching disc shown on the line X—X of Figure IX.

Figure XI is a sectional view through the broaching disc shank showing the coolant distributing holes in the shank and pilot bush on the line XI—XI of Figure IX.

Figure XII is a section through the gun barrel on the line XII—XII of Figure XIII showing the rifling in the gun when completed by the broaching disc cutter.

Figure XIII is an enlarged fragmentary section through the gun and showing the broaching disc and shank and broaching bar in the bore of the gun near the end of a stroke through the gun during the rifling operation, as shown on the line XIII—XIII of Figure XII.

The machine comprises a bed 1, which is suitably mounted on supporting legs 2, 3, 4, and 5. On top of the bed are provided suitable ways 6 and 7 extending longitudinally the entire length of the top of the bed. On the bed is provided suitable work carrying members 8 and 9, in which may be securely mounted a gun 10 preparatory to cutting the rifling grooves in its bore which has been previously machined.

Midway of the bed 1 of the machine, is provided the apparatus for accurately and positively guiding the rifling bar 11, on which is mounted the broaching disc cutter 12. This arrangement comprises a housing 13, Figure V, which is securely bolted to the bed 1 of the machine by suitable screws 14. This member 13 has a bottom surface 15 and side surfaces 16 and 17 and also a top surface 18 formed by a cover plate 19 securely bolted to the top surface 20 of the housing member 13. Between these surfaces 15, 16, 17, and 18 are carried a series of accurately sliding blocks 21, 22, 23, and 24 and a block 25 which is connected to the rifling bar 11 by a suitable key 26 fixed to the block 25 and engaging in a notch 27 formed in the bar 11.

In each of these blocks 21, 22, 23, and 24 is formed an accurate bore 28 the same size as the bore 76 of the gun to be rifled, in which the peripheral surface 29 of the broaching bar 11 is free to nicely slide in accurately guided position.

The periphery 29 of the broaching bar 11 is relieved by a spiral groove 29a (not related to the spiral of the rifling grooves) to eliminate too great a frictional contact between the surface 29 and the bores in the blocks 21, 22, 23, and 24 and the bore 76 in the gun 10 and to provide space for fine particles of foreign matter resulting from the cutting action of the tool in the bore of the gun. The broaching bar 11 is connected through a suitable tapered socket arrangement 30 to the actuating spiral guide bar 31, which is arranged to freely slide in a guide bushing 32 fixed on the right hand end of the housing 13 fixed in a bracket 33 on the right hand end of the housing 13. Also on this bracket 33 are fixed the blocks 34 by suitable screws 35 in which are adjustably carried the studs 36 which are adjustable by suitable thumb nuts 37 and which studs in turn are connected to the guide keys 38 which operate in the spiral guide grooves 39 formed in the guide bar 31 for effecting the rotation of the bar 31 and thereby the broaching bar 11 in proper lead for the correct spiral angle for the rifling groove as the bar 31 is advanced longitudinally of the gun barrel.

This longitudinal movement of the guide bar 31 is effected by means of the guide bar carriage 40 which is slidably mounted on the bed ways 6 and 7 and has the upper projection 41 in which is rotatably mounted against axial movement the guide bar 31. The carriage 40 may be actuated along the bed ways 6 and 7 at appropriate feeding speeds by the usual feed screw 42, which is driven through suitable transmission means in the casing 43 by the motor 44.

On the outer end of the rifling bar 11, is mounted the broaching disc cutter shank 45 by a suitable threaded connection 46 in the hollow bore 47 of the bar 11. By rotating the shank 45 in the thread 46, the pilot bushing 48 may be securely locked between the end face 49 of the rifling bar 11 and the face 50 formed on the annular enlarged portion 51 of the shank 45. On the outer end of the shank 45 is mounted the broaching disc 12, which has a series of projecting cutting edges 52, as best seen in Figure X, corresponding to each of the grooves 53, Figure XII, to be cut in the bore 76 of the gun 10. This cutter is securely mounted on the shank 45 by the nut 54 threaded on the portion 55 of the shank 45 and is thereby drawn tightly against the face 56 of the portion 51 of this shank. A suitable key 57 fixed in the shank 45 by a suitable screw 58 and having an enlarged outer portion entering into the slot 59 provided in the broaching disc cutter 12, serves to prevent relative rotation of this cutter on the shank 45.

Coolant is also provided for the shank for cooling and lubricating the cutter and lubricating the sliding of the pilot bushing 48 and the boring bar 11 in the gun bore and also in the bores 26 of the blocks 21, 22, 23, and 24, as described. This coolant and lubricating medium is provided by suitable conventional hydraulic pump 60 which takes coolant medium from the reservoir 61 and transmits it through the lines 62 and 63, into the bore 64 in the guide bar 31 and then into the bore 47 of the rifling cutter bar 11 and then into the bore 65 in the shank 45, from which bore 65 radiates the distributing holes 66 which open into an annular groove 67 formed therein. The pilot bush 48 is formed with a series of slots 68, which communicate with this annular groove 67 to thereby distribute the coolant to the surfaces of the pilot bush and the boring bar 11, to thereby lubricate these sliding members and also to effect the cooling of the broaching disc cutter 12 and to wash the chips ahead of the cutting edges 52 of the cutter out of the left hand end of the bore of the gun as the rifling proceeds.

The operation of this arrangement is substantially as follows:

Assuming the broaching bar 11 to be fully retracted from the bore of the gun 10 as shown in Figure IV, the various supporting blocks 21, 22, 23, 24, and 25, it will be distributed along the housing 13, as shown in Figure IV, as will be described. Likewise, the grooved guide bar 31 will be retracted to the right, as shown in Figures IV and VI, with the carriage 40 at the extreme right hand of the bed 1.

The motor 44 is then energized to cause rotation of the screw 42, whereupon the carriage 40 feeds to the left, toward the gun 10 causing the guide bar 31 to move longitudinally and also to slowly rotate as it slides through the keys 38, Figure VII, in moving through the bushing 32 in the bracket 33, as described. Likewise, the broaching rifling bar 11 which is securely fixed to the guide bar 31, will similarly move forward out of the guide bushing 47a fixed in the bracket 13 toward the gun 10. As the bar 11 thus begins to move to the left, Figure VIII, it will normally tend to slide its periphery 29 in the various bores 28 of the blocks 21, 22, 23, and 24, these blocks normally remaining unmoved in the bracket 13 until the block 24 is engaged by the block 25 fixed on the bar 11. As this block 25 comes into engagement with the block 24, its latch pin 69 will engage under the latch 70 pivotally mounted on the block 24 by a suitable pin 71 and will latch itself under the outer end 72 of the latch 70 and while in such a position will also be moved along by the block 25 which abuts against it as the rifling bar 11 is moved to the gun barrel. Likewise the similar latches 73, 74, and 75 will also engage the respective pins 69 of the blocks 23, 22, and 21, so that when the broaching bar 11 finally reaches the end of its stroke with its cutter 12 projecting out from the left hand end of the gun 10, all of these blocks will have been accumulated together at the left hand end of the housing 13 and will all be latched together by the respective latches 70, 73, 74, and 75.

During this forward movement of the broaching bar 11, its periphery 29 will also ride in nice sliding contact with the bore 76 of the gun barrel, so as to rigidly support this bar its entire length in the bore of the gun. In addition to the normal support offered the cutter by the pilot leads 48, which also nicely slides in the bore 76 of the gun, as described.

After the cutter 12 has thus completed a pass through the bore of the gun, it is then removed and the bar 11 and shank 45, fixed thereon, is returned to the right hand end of the gun for the insertion of a new cutter of slightly larger size again on the shank for another pass through the gun bore. This return movement of the rifling bar 11 by reversal of the motor 49 which draws the carriage 40 to the right, causes the block 25, which under these conditions is now latched to all of the blocks 24, 23, 22, and 21, to begin to draw these blocks likewise backwardly to the right until the first block has its pawl 77 engaged by a knock-off pin 76, fixed in the housing 13, a predetermined distance from the left hand end thereof. The result of engagement of the pawl 75 with this pin 76 causes the latch to release the block 21 from the rearward motion caused by the return of the bar 11 and to thereby leave this block 21 at this predetermined position. An additional projecting surface 77 is also formed on the pawl 75, which may positively engage against the side of the pin 76 in the event friction between the surface 29 of the bar 11 and the bore 28 of the block 21 would tend to cause this block to creep out of its predetermined position it is to be stopped in for supporting the bar. Similarly, each of the respective pawls 74, 73, and 70 are likewise engaged at predetermined intervals by pins 78, 79, and 80, all of which pins are staggered, as shown best in Figure V, so that each of the respective blocks 21, 22, 23, and 24, will be automatically positioned at spaced intervals along the housing 13, so as to form a substantially continuous supporting means for this bar when fully retracted from the bore of the gun 10. In this way the bar is again brought into condition for return into the gun bore for another cutting operation after a new and slightly larger cutter 12 has been placed on the shank 45.

It will thus be seen that with this arrangement the rifling bar 11 is not only supported by the pilot bush on the shank, and in the spiral groove guide bar 31, but is also supported at all times throughout its entire length whether it is in the gun bore, or whether it is fully removed from the gun bore. It is also to be noted that the rifling bar 11 is arranged to be supported at a predetermined number of positions as it progressively moves in or out of the gun bore in which it is also fully supported during the rifling operation.

Having thus fully set forth and described our invention what we claim as new and desire to secure by United States Letters Patent is:

1. In a gun rifling machine, a bed, means on said bed for rigidly supporting a gun to be rifled longitudinally of said bed, a rifling carriage movable on said bed to and from said gun, a spiral guide bar connected rotatably to said carriage for movement longitudinally of said bed, a rifling bar connected to the end of said spiral guide bar, means for supporting said spiral guide bar on said bed, and means in said supporting means operating in the spiral groove of said guide bar and rifling bar, and means between said supporting means for said guide bar and said gun for rigidly supporting said rifling bar for any position of relative movement of said rifling carriage on said bed, said means comprising a housing fixed on said bed, a series of slidable blocks mounted for accurate sliding movement longitudinally of said bed in said housing, a series of bores in each of said blocks through which said rifling bar nicely slides, and means for automatically distributing said blocks at spaced intervals in said housing by the movement of said rifling bar into or out of said barrel.

2. In a gun rifling machine, a bed, means on said bed for rigidly supporting a gun to be rifled longitudinally of said bed, a rifling carriage movable on said bed to and from said gun, a spiral guide bar connected rotatably to said carriage for movement longitudinally of said bed, a rifling bar connected to the end of said spiral guide bar, means for supporting said spiral guide bar on said bed, and means in said supporting means operating in the spiral groove of said guide bar and rifling bar, and means between said supporting means for said guide bar and said gun for rigidly supporting said rifling bar for any position of relative movement of said rifling carriage on said bed, said means comprising a housing fixed on said bed, a series of slidable blocks mounted for accurate sliding movement longitudinally of said bed in said housing, a series of bores in each of said blocks through which said rifling bar nicely slides, and means for automatically distributing said blocks at spaced intervals in said housing by the movement of said rifling bar into or out of said gun barrel, and means on said rifling bar engaging the bore of said gun for supporting said rifling bar when in said gun bore.

3. In a rifling machine, a frame, means for rigidly mounting a gun on said frame, a rifling bar carriage movable on said frame relative to said gun, a rifling bar fixed on said carriage for movement into or out of the bore of said gun, and means for supporting said rifling bar when removed from the bore of said gun comprising a series of supporting members mounted on said frame arranged at a series of predetermined positions between said carriage and said gun, and means for automatically orienting said supporting means at said predetermined positions by the movement of said rifling bar out of the bore of said gun.

4. In a rifling machine, a frame, means for rigidly mounting a gun on said frame, a rifling bar carriage movable on said frame relative to said gun, a rifling bar fixed on said carriage for movement into or out of the bore of said gun, and means for supporting said rifling bar when removed from the bore of said gun comprising a series of supporting members mounted on said frame arranged at a series of predetermined positions between said carriage and said gun, and means for automatically orienting said supporting means at said predetermined positions by the movement of said rifling bar out of the bore of said gun, said means comprising a series of latches on each of said supporting means arranged to engage their associated supporting means as said rifling bar is moved into said gun bore and means on said frame for actuating said latch means at said predetermined location for arresting further movement of each of said supporting means at a particular place as said rifling bar is withdrawn from said gun barrel, so as to position them at a series of spaced intervals for supporting said rifling bar at a plurality of different points when removed from said gun bore.

5. In a rifling machine, a frame, means for rigidly mounting a gun on said frame, a rifling bar carriage movable on said frame relative to said gun, a rifling bar fixed on said carriage for movement into or out of the bore of said gun, and means for supporting said rifling bar when removed from the bore of said gun comprising a series of supporting members mounted on said frame arranged at a series of predetermined positions between said carriage and said gun, and means for automatically orienting said supporting means at said predetermined positions by the movement of said rifling bar out of the bore of said gun, said means comprising a series of latches on each of said supporting means arranged to engage their associated supporting means as said rifling bar is moved into said gun bore and means on said frame for actuating said latch means at said predetermined location for arresting further movement of each of said supporting means at a particular place as said rifling bar is withdrawn from said gun barrel, so as to position them at a series of spaced intervals for supporting said rifling bar at a plurality of different points when removed from said gun bore, and means on said rifling bar engaging said supporting members and also engaging in the bore of said gun whereby said rifling bar is supported rigidly against axial bending both when in said bore of said gun, or when removed from said bore.

WILLIAM F. GROENE.
WALTER R. MEYER.